United States Patent [19]

Ellis

[11] Patent Number: 5,394,557
[45] Date of Patent: Feb. 28, 1995

[54] STATE MACHINE OPERATING IN MULTIPLE PARALLEL PHASE AND METHOD THEREOF

[75] Inventor: David Ellis, Hillsboro, Oreg.

[73] Assignee: Intel Corporation, Santa Clara, Calif.

[21] Appl. No.: 998,795

[22] Filed: Dec. 30, 1992

[51] Int. Cl.6 .......................... G06F 1/08; G06F 1/24; G06F 11/34; G06F 13/42

[52] U.S. Cl. .................................. 395/800; 364/229.5; 364/230.5; 364/232.22; 364/234.1; 364/238.9; 364/238.7; 364/239.7; 364/239.8; 364/240.8; 364/242.92; 364/242.91; 364/244.9; 364/247.3; 364/259.9; 364/259.6; 364/264.1; 364/264.7; 364/267.6; 364/269; 364/DIG. 1; 364/DIG. 2; 326/40

[58] Field of Search ............... 395/800, 325, 250, 275, 395/500, '550, 200, 375; 364/DIG. 1, DIG. 2; 307/465, 590, 480, 452; 371/22.5

[56] References Cited

U.S. PATENT DOCUMENTS

| 4,764,126 | 8/1988 | Knight et al. | 371/22.5 |
| 4,818,200 | 10/1989 | Asphar et al. | 365/189.02 |
| 5,168,177 | 12/1992 | Shankar et al. | 307/465 |
| 5,287,017 | 2/1994 | Narasimhan et al. | 307/465 |

Primary Examiner—Alyssa H. Bowler
Assistant Examiner—Daniel H. Pan
Attorney, Agent, or Firm—Blakely, Sokoloff, Taylor & Zafman

[57] ABSTRACT

A state machine circuit comprising a first phased circuit clocked by a first phased clock and a second phased circuit clocked by a second phased clock. The first phased circuit includes a first input register which sequences and stores at least one input signal; a first combinatorial logic network which produces a number of output control signals wherein each of the control signals has a next state signal and a jump index signal; a first multiplexer to select one of the output control signals; and a first output register which sequences and stores the selected output control signal and also (i) feeds back the next state signal into the first combinatorial logic network, (ii) outputs the jump index into a second selector, and (iii) outputs the selected control signal, absent the next state signal and the jump index, to a device. The second phased circuit is identical in structure and function to the first phased circuit and includes a second input register, a second combinatorial logic network, a second multiplexer and a second output register.

31 Claims, 5 Drawing Sheets

STATE MACHINE OPERATING IN MULTIPLE PARALLEL PHASE AND METHOD THEREOF

BACKGROUND OF THE INVENTION

1. Field of the Invention

The present invention relates to a device which sequences control signals. More particularly, the present invention relates to a state machine which is more reliable than conventional state machines and is capable of sequencing control signals at approximately twice the normal frequency of a similarly functioning state machine using conventional techniques.

ART BACKGROUND

Many electronic devices using digital logic are controlled by state machines. Such state machines receive as input at least one critical control signal containing state information and in return provide control outputs to the electronic device.

Currently, there exists two types of state machines: asynchronous and synchronous. Asynchronous state machines are difficult to design and are used less frequently than synchronous state machines. The primary distinction between these two types of state machines is that asynchronous state machines do not use clocked state retaining memory elements to store the present state of the device for controlling purposes. Rather, they usually rely on inputted quantitative measurements. For example, a traffic signal light is controlled by an asynchronous state machine in the form of a tripping mechanism which causes the signal light to change states (i.e., from red to green and vice versa) after an on-coming car activates the tripping mechanism positioned below the street.

The second and more relevant of the two-types of state machines is the synchronous state machine which uses system clocked state retention memory components such as registers in determining the present state of the device. Prior to the present invention, synchronous state machines were designed according to FIG. 1 having an input register 1 to receive an input signal 3, a combinatorial logic circuit 5, which is an interconnection of standard logic gates used to produce a plurality of output control signals 8 and 9 including a control signal having next state information ("the next state signal") 8, and an output register 7 which stores one or more output control signals so that the next state signal becomes a present state signal 6 containing the new present state of the device. The output register 7 then feeds back the present state signal 6 into the combinatorial logic circuit 5 to aid in the determination of a subsequent next state signal.

However, in order for a state machine to function properly, the output register must feed back the present state signal into the combinatorial logic circuit, and the combinatorial logic circuit must (i) produce a plurality of output control signals including the next state signal and (ii) output the control signals into the output register, all within one system clock cycle ("the critical path"). However, in general, as the complexity of the combinatorial logic circuit increases, the required number of standard logic gates increases. Since each standard logic gate within the combinatorial logic circuit has a physical time delay contributing to the total time delay, conventional state machines become unstable as the sum total of the time delays approaches the critical path. Moreover, numerous inputs, states or even outputs add to the total time delay.

Because of this limitation, most conventional state machines can reliably control only devices within a system using slower processor rates and become unreliable when implemented into a system incorporating processors having faster processing rates simply because the speed or frequency of the processor is an inverse function of the critical path. Therefore, an increase in speed/frequency directly decreases the duration of the critical path requiring the conventional state machine to operate within a shorter budgeted time period.

It would be a great advantage and, is therefore an object of the present invention, to provide a phased parallel state machine phased with redundant combinational logic circuits to increase the critical path so as to provide better stability and allow the state machine to support a device functioning at a faster processor rate.

SUMMARY OF THE INVENTION

A circuit is disclosed which adapts the advantages associated with a phased parallel state machine and overcomes the above-mentioned disadvantages and limitations associated with conventional state machines used to control sequential processes.

It is an object of the present invention to provide a synchronous state machine able to support processors that run at frequencies that are not normally supported by circuit fabrication technologies..

It is also an object of the present invention to enlarge the critical path thereby providing a more stable synchronous state machine.

It is a further object of the present invention to provide an inexpensive means of supporting processors that run at frequencies that are not normally supported by circuit fabrication technologies.

These and other objects of the present invention are provided in a circuit for sequentially processing at least one input signal to control at least one device, said state machine circuit comprising a first phased circuit clocked by a first phased clock and a second phased circuit clocked by a second phased clock.

The first phased circuit includes a first input register, a first combinatorial logic network, a first multiplexor and a first output register. The first input register, clocked by said first phased clock, sequences and stores the input signal and outputs said input signal to the first combinatorial logic network. The first combinatorial logic network produces a plurality of output control signals based on the input signal and a first phase present state signal outputted from the first input register and the first output register respectively. Each of these output control signals includes a next state signal and a jump index signal. The first multiplexor receives, as input, the plurality of output control signals and selects one of the plurality of output control signals to be inputted into the first output register. The first output register sequences and stores the selected output control signal so that the next state signal of the selected output control signal becomes the first phase present state signal. The first output register then feeds back the first phase present state signal into the first combinatorial logic network and outputs the jump index signal into a second multiplexor through a connecting circuit.

The second phased circuit is an exact duplicate of the first phased circuit but is clocked by a second phased clock in lieu of the first phased clock. The second phased circuit includes a second input register, a second combinatorial logic network, the second multiplexor and a second output register. The second input register, clocked by said second phased clock, sequences and stores the input signal and outputs the same to the second combinatorial logic network. The second combinatorial logic network produces a plurality of output control signals based respectively on a second phase present state signal and the input signal outputted from the second output register and the second input register. Each of these output control signals include a next state signal and a jump index signal. The second multiplexor receives, as input, the plurality of output control signals and inputs one of said plurality of output control signals into said second output register. The second output register sequences and stores the selected output control signal so that said next state signal of said selected output control signal becomes said second phase present state signal. The second output register feeds back the second phase present state signal into said second combinatorial logic network, outputs the jump index signal into the first multiplexor through the connecting circuit. Such a process continues to effectively control said at least one device at a system processor rate twice the frequency of the each phased clocks.

BRIEF DESCRIPTION OF THE DRAWINGS

The objects of the present invention will be described with respect to the following figures in which.

DETAILED DESCRIPTION OF THE INVENTION

A device is described which is useful for sequentially processing control signals. In the following detailed description, numerous specific details are set forth, such as specific circuit components. It is apparent, however, to one skilled in the art that the present invention may be practiced without incorporating the specific circuit components. Moreover, a specific example has been created for the sole purpose of illustrating the differences in operation between a conventional state machine and the present invention. This specific example lends itself to explaining the operation of a prior art state machine and distinguishes the present invention therefrom, but is in no way a limitation on the scope of the present invention.

The present invention provides an ability to control and support processors that run at higher frequencies which are not normally supported by circuit fabrication technologies. It should be borne in mind that the present invention need not be limited for use in controlling and supporting processors, but may find wide application for controlling and supporting any device including, but not limited to memory units.

Figure 1:
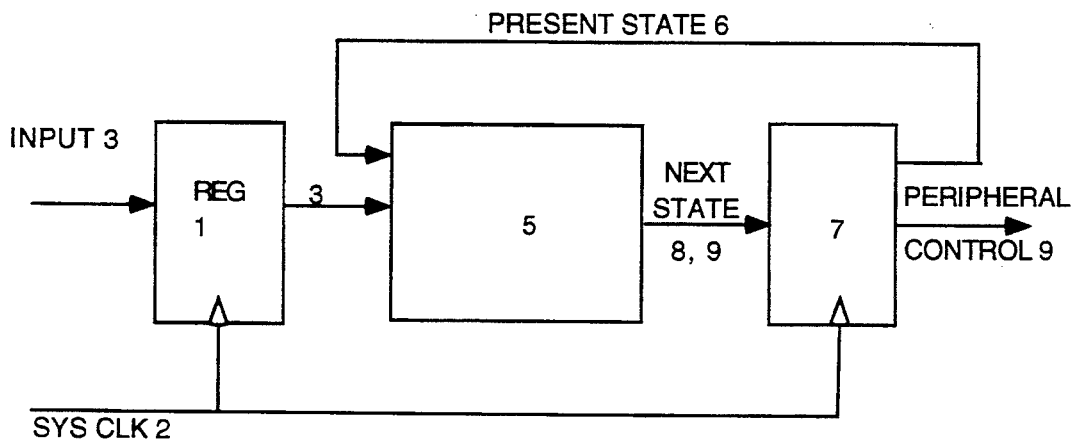
FIG. 1 is a block circuit diagram of a conventional state machine.

As previously discussed herein, FIG. 1 illustrates a conventional state machine comprising an input register 1 clocked by a system clock 2. The input register 1 sequences and stores an input signal 3 and outputs the input signal into a combinatorial logic circuit 5. The combinatorial logic circuit 5 usually comprises a circuit of standard logic gates interconnected to function in accordance with one or more pre-determined Boolean equations from which the standard logic gates were translated. Both the input signal 3 and a signal having present state information (hereinafter referred to as a "present state signal") 6, are inputted into the combinatorial logic circuit 5 in order to compute a plurality of control signals including a next state signal 8 and a plurality of peripheral control signals 9. The next state signal 8 provides information which influences the control signals outputted by the state machine in the next clock cycle. The peripheral control signals 9, are mostly used to control external devices supported by the conventional state machine. The plurality of control signals 8 and 9 are inputted into an output register 7. The next state signal 8 becomes the present state signal 6 of the device once it has been sequenced and stored by the output register 7. The output register 7 then feeds back the present state signal 6 into the combinatorial logic circuit 5 to aid in the determination of a subsequent next state signal.

As previously mentioned herein, for the purpose of distinguishing the operation of the conventional state machine from the present invention, the operations are described of a conventional state machine and the present invention used as edge-sensitive processor controllers designed to request access to a memory bus upon receipt of an active input signal having a duration of exactly two system clock cycles. This hypothetical processor controller has five states: state "zero" when the controller is reset or in a resting state; state "one" when an input signal has been detected as active after being inactive in the previous system clock cycle; state "two" when the input signal has been detected as active for two system clock cycles; state "three" when the input signal becomes inactive after being active for the previous two system clock cycles; and state "four" when the input has been active for more than two system clock cycles.

Figure 2:
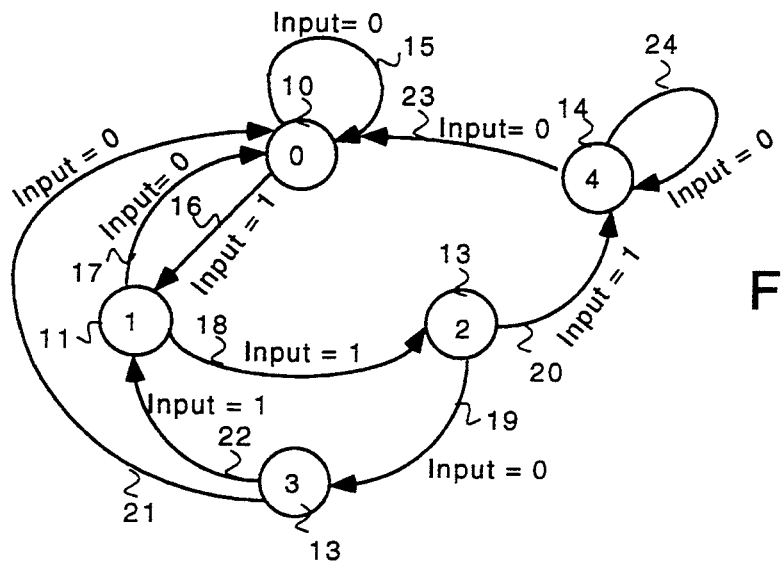
FIG. 2 is a state diagram of a specific example of a prior art state machine having five states and acting on an input signal active for two system clock cycles.

As shown in the state diagram in FIG. 2, the state machine has five states numbered "zero" through "four" denoted by circles 10, 11, 12, 13 and 14. Each of these states has two state transitions represented by arrows 15, 16, 17, 18, 19, 20, 21, 22, 23 and 24, which are the only possible transitions in the next clock cycle from their respective states. Such a state diagram can be transformed into the following simple and programmable Boolean equations involving the present state ("PS"), input ("I") and next state ("NS") signals:

(1) If PS="zero" and I="0", then NS="zero"; or
(2) If PS="zero" and I="1", then NS="one"; or
(3) If PS="one" and I="0", then NS="zero"; or
(4) If PS="one" and I="1", then NS="two"; or
(5) If PS="two" and I="0", then NS="three"; or
(6) If PS="two" and I="1", then NS="four"; or
(7) If PS="three" and I="0", then NS="zero"; or (8) If PS="three" and I="1", then NS="one"
(9) If PS="four" and I="0", then NS="zero"
(10) If PS="four" and I="1", then NS="four"

Through these Boolean equations, the combinatorial logic circuit can be translated into a common state table as shown below.

TABLE 1

| PRESENT STATE ("PS") | INPUTS ("I") | NEXT STATE ("NS") |
|---|---|---|
| 0 | 0 | 0 |
| 0 | 1 | 1 |
| 1 | 0 | 0 |
| 1 | 1 | 2 |
| 2 | 0 | 3 |
| 2 | 1 | 4 |
| 3 | 0 | 0 |
| 3 | 1 | 1 |
| 4 | 0 | 0 |
| 4 | 1 | 4 |

This state table ("Table 1") identifies the next state signal outputted from the combinatorial logic circuit 5 of FIG. 1 as a function of the present state signal 6 and the input signal 3 for this particular example.

Figure 3:
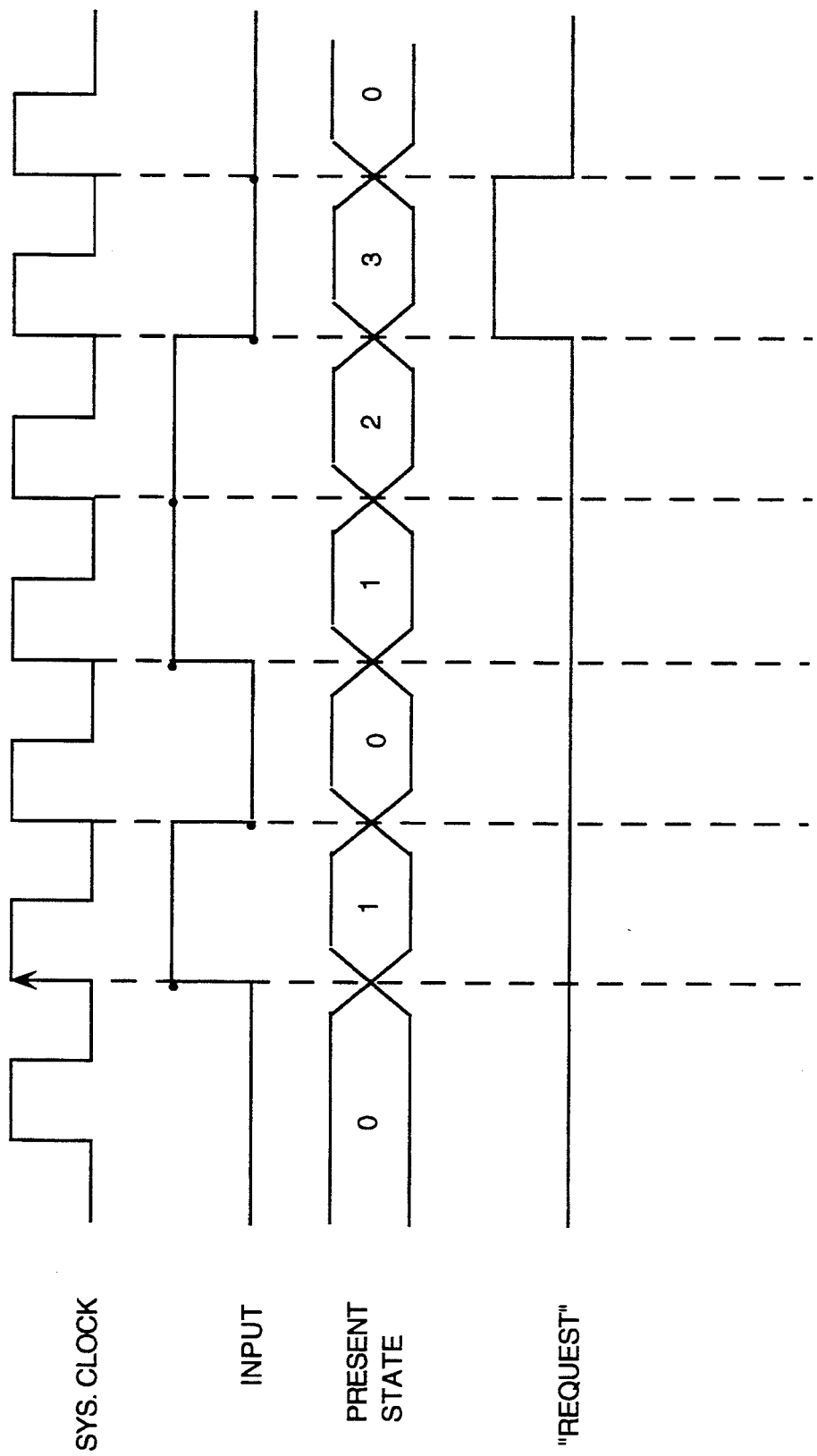
FIG. 3 is a timing diagram of various control signals in a conventional state machine according to the specific example.

The prior art as shown in FIG. 1 will now be described while in operation with respect to the input signal as shown in FIG. 3 and in accordance with the state diagram in FIG. 2.

The processor controller incorporating the conventional state machine of FIG. 1 would initially be at rest in state "zero" (PS=0). Once the input signal 3 becomes active, a state transition does not instantaneously occur. Rather, the input signal 3 would be sequenced and stored by the input register 1 until the next clock cycle. The input signal 3 having a logic level "1"(I=1) is inputted into the combinatorial logic circuit 5. Moreover, the present state 6 (PS=0) is additionally inputted into the combinatorial logic circuit 5 from the output register 7. In accordance with Table 1, the combinatorial logic circuit 5 would output a next state signal 8 having a state value of "one" (NS=1) into the output register 7. The next state signal 8 (NS=1) would be registered by the output register 7 so as to become the present state signal 6 indicating that the processor is currently in state "one" (PS=1).

In the next clock cycle, the input register 1 would sequence and store the input signal 3 having a logic level "0" because the input signal 3 has become inactive. The input signal 3 (I=0) and the present state signal 6 (PS=1) would be inputted into the combinatorial logic circuit 5. Based on these inputted signals, the combinatorial logic circuit 5 would then output a next state signal 8 having a state value of "zero" (NS=0) to the output register 7 and, based on the operations described above, the present state signal 6 would now hold a state value of "zero" (PS=0).

In the third clock cycle, input register 1 would sequence and store the input signal 3 having a logic level "1". The input signal 3 (I=1) and the present state signal 6 (PS=0) would be inputted into the combinatorial logic circuit 5 resulting in a next state signal 8 having a state value of "one" (NS=1) and the present state signal 6 would hold a state value of "one" (PS=1).

In the next clock cycle, the input register 1 would sequence and store a "high-level" input signal 3, as shown in FIG. 3. Thus, the present state would be incremented to state "two" (PS=2) since the input signal 3 is active (I=1) and the present state signal 6 held a state value of "one" (PS=1) in the previous clock cycle.

In the fifth next clock cycle, the input register 1 would store a "low-level" input signal 3. As a result, the input register 1 would output a "0" to the combinatorial logic circuit 5. Since the present state signal 6 would have a state value of "two" (PS=2), indicating a "high-level" signal for two system clock cycles, and the input signal 3 would be "0", the combinatorial logic circuit 5 would output a next state signal 8 having a state value of "three" (NS=3) thereby activating a control signal "Request" in FIG. 3 to request access to the memory bus.

Figure 4:
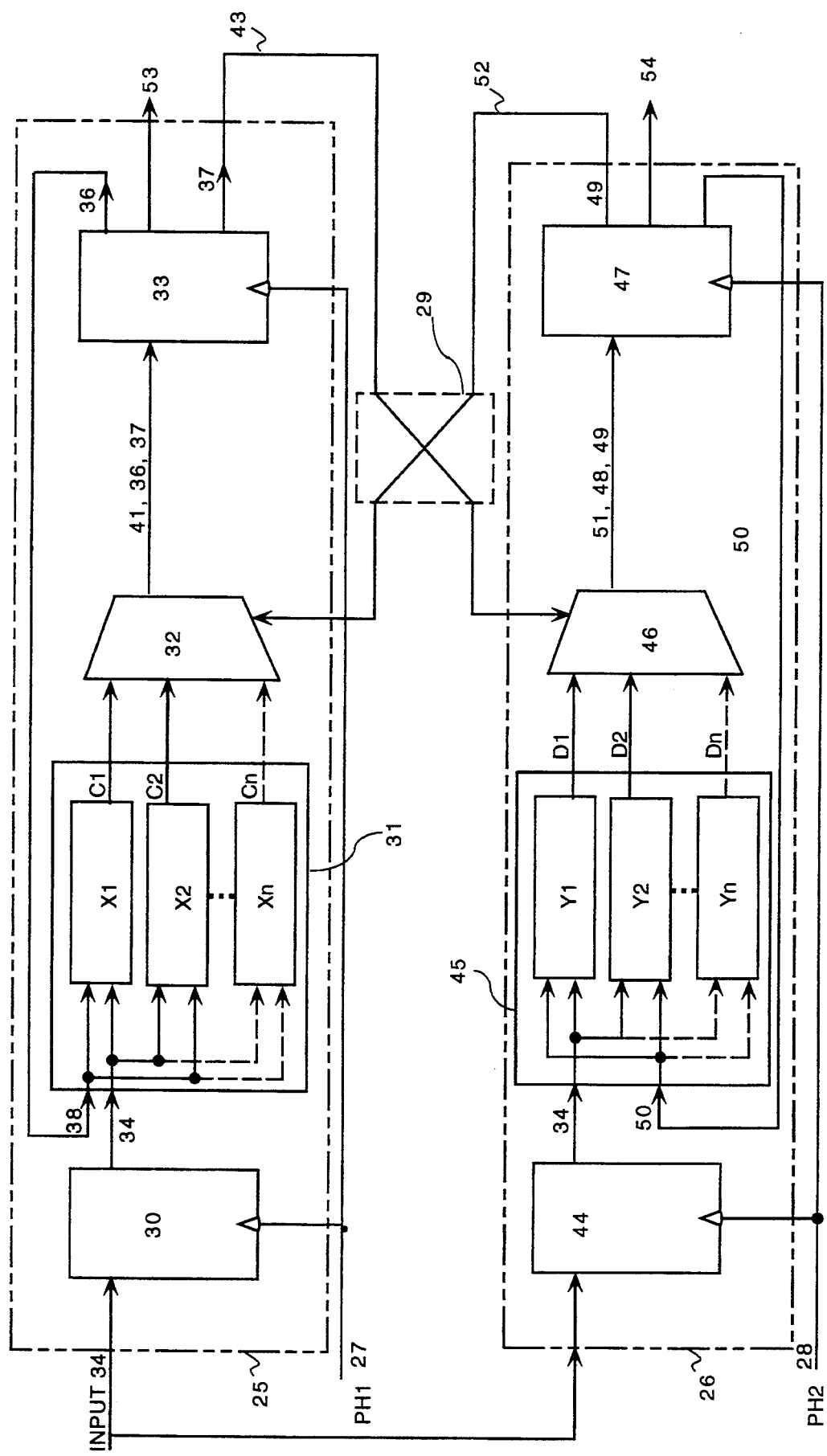
FIG. 4 is a block circuit diagram showing an embodiment of the present invention.

Referring to FIG. 4, the preferred embodiment of the present invention is illustrated. The preferred embodiment comprises a first phased circuit 25 and a second phased circuit 26. The first phased circuit 25 and a second phased circuit 26 are respectively clocked by a first phased clock 27 and a second phased clock 28 as denoted by PH1 and PH2 in the timing diagram of FIG. 7. Each phased clock 27 and 28 is onehalf the frequency of the system clock, but the second phased clock 28 is 180° out of phase from the first phased clock 27. The first phased circuit and the second phase circuit are electrically coupled together by a connecting circuit 29.

The first phased circuit 25 sequences and processes control signals in combination with the second phased circuit 26 in order to determine the present state of a device. The first phased circuit 25 includes a first input register 30, a first combinatorial logic network 31, a first multiplexor 32 and a first output register 33.

The first input register 30, which is clocked by the first phased clock 27, sequences and stores at least one input signal 34; however, one skilled in the art may implement other state retaining components to sequence and store the input signal 34.

The first combinatorial logic network 31 is electrically coupled to the first input register 30, the first multiplexor 32 and the first output register 33. The first combinatorial logic network 31 includes a plurality of combinatorial logic circuits denoted by X1 through Xn. The number of combinatorial logic circuits "N" is equivalent to the maximum number of state transitions from any state (i.e., the maximum number of arrows outputted from any state within a state diagram). Each combinatorial logic circuit includes either programmable components such as logic arrays or, if the usage of the state machine is to perform a fixed algorithm based on specific Boolean equations, standard logic gates such as ANDs, ORs, NORS, etc. These standard logic gates are electrically interconnected so as to operate in accordance with the pre-determined Boolean equations.

The input signal 34 and a signal containing present state information of the first phased circuit (a "first phase present state") 38 are inputted into each combinational logic circuit within the first combinatorial logic network 31. From these inputs, each combinatorial logic circuit produces a plurality of control signals, denoted by C1 through Cn. Each of these control signals C1 through Cn includes a next state signal and a jump index signal. The next state signal is used to identify the present state of the first phased circuit while the jump index signal provides information to the second phased circuit 26 regarding the previous state transitions made by the first phased circuit 25.

The first multiplexor 32 receives a plurality of output control signals, labeled C1 through Cn, from each combinatorial logic circuit. The first multiplexor 32 outputs to the first output register 33 one of said plurality of output control signals, hereinafter referred to as "the selected output control signal" 41 having a corresponding next state signal 36 and jump index signal 37. Such selection, however, is based on a jump index signal 49 inputted through a connecting circuit 29.

The first output register 33, clocked by the first phased clock 27, is a state register but one skilled in the art may implement other components having state retention capabilities to perform similar functions. In the preferred embodiment, the first output register 33 receives, as input, the selected output control signal 41 and sequences and stores this control signal so that the next state signal 36 becomes the first phase present state signal 38. The first output register 33 then feeds back the first phase present state signal 38 into all "N" combinatorial logic circuits, C1 through Cn, within the first combinatorial logic network 31 while the jump index signal 37 is outputted through said connecting circuit 29 into a second multiplexor 46. Moreover, the first output register outputs a plurality of first phase peripheral control signals 53 to control at least one device.

The second phased circuit 26 is an exact duplicate of the first phased circuit 25 but is clocked by a second phased clock 28 in lieu of the first phased clock 27. The second phased circuit 26 includes a second input register 44, a second combinatorial logic circuit 45, a multiplexor 46 and a second output register 47.

The second input register 44 is clocked by the second phased clock 27 so that it sequences and stores the input signal 34 at a frequency 180° out-of-phase from the first phased clock 27. Therefore, when these two phased clocks 27 and 28 are combined, the resulting signal would have a frequency equivalent to the system clock. However, as mentioned previously herein, other state retention components may be implemented in lieu of a register.

The second combinatorial logic network 45 is identical in function and design to the first combinatorial logic network 31 but is electrically coupled to the second input register 44, the second multiplexor 46 and the second output register 47. The second combinatorial logic network 45 includes a plurality of combinatorial logic circuits denoted by Y1 through Yn. Each combinatorial logic circuit produces a plurality of output control signals, denoted as D1 through Dn. Each of these control signals include a next state signal and a jump index signal which are functions of a signal containing present state information for the second phased means (a "second phase present state") 50 and the input signal 34 outputted respectively from the second output register 47 and second input register 44. Upon receipt of the input signal 34 and the second phase present state signal 50, each of the "N" combinational logic circuit outputs a plurality of control signals including the next state signal and the jump index signal.

The second multiplexor 46 is electrically coupled to the second combinatorial logic network 45 to output the selected output control signal 51 including the corresponding next state signal 48 and jump index signal 49. The selected output control signal 51 is inputted into said second output register 47 which is clocked by the second phased clock 28.

The second output register 47 receives, as input, the selected output control signal 51 and sequences and stores the selected output control signal 51 it so that the next state signal 48 becomes the second phase present state signal 50. The first output register 47 then feeds back the second phase present state signal 50 into all "N" combinatorial logic circuits within the second combinatorial logic network 45 while the jump index signal 49 is inputted through the connecting circuit 29 into a first multiplexor 32. Moreover, similar to the first output register 33, the second output register 47 outputs a plurality of second phase peripheral control signals 54, to at least one device.

These two phase circuits 25 and 26 are interconnected by a connecting circuit 29. In the preferred embodiment, the connecting circuit includes a first select line 43 coupling the second multiplexor 46 with the first output register 33 and a second select line 52 coupling the first multiplexor 32 with the second output register 47. Therefore, the first select line 43 operates as a select line to choose the select output control signal 51 based on the value of the jump index 37 and the second select line 52 transmits the value of the jump index 49 to select output control signal 41. These select lines 43 and 52 are designed to transmit a jump index signal having a value from "0" to "N-1" where there are "N" combinatorial logic circuits within each of the first and second combinatorial logic return to 31 and 45. Although the connecting circuit 29 preferably comprises cross-linking dual select lines 43 and 52, it may be designed to have components connected thereto, such as standard logic gates or other digital logic components to affect the signal placed on these select lines.

The above-described first and second phased circuit 25 and 26 continue to alternatively calculate the present state of the device and chose the selected output control signal through jump index signals which provide information to an alternate phased circuit about a previous state transition made by the another phased circuit.

Although there exists only two phased circuits in the preferred embodiment, the present invention can incorporate "M" phased circuits where M>2, wherein each phased circuit is clocked by a predetermined one of "M" phased clocks. Idealistically, the first phased circuit is clocked by a first phased clock at a rate equal to (system clock/M) and each successive phased circuit is clocked at the same rate but at different phases from the first phased clock according to the relationship (R)*(360°/M) where R=1 for the second phased clock and "R" is incremented by the successive phased clock needed. For example, if the present invention used three phased circuits and was in a system having a system clock of 60 MHz, each phased circuit would be clocked at 20 MHz. The first phased circuit would be clocked by a first phased clock at 20 MHz. A second phased circuit would be clocked at 20 MHz, but 120° (1)(360°/3) out-of-phase with the first phased clock. The third phased circuit would be clocked by the third phased clock at 20 MHz, but 240°(2)(360°/3) out-of-phase with the first phased clock.

Moreover, another embodiment of the present invention, not shown in any of the figures herein, may consist of a parallel phased state machine having a first phased circuit and a second phased circuit similar to the preferred embodiment, absent input registers from both the first and second phased circuits. Instead, the input signal would be externally sequenced from both phased circuits at the appropriate phased clocking frequency before being inputted therein.

The operation of the present invention may best be understood by continuing the specific example previously described herein for discussing the operation of the present invention. As previously mentioned herein, this specific example lends itself to explaining the operation of the present invention and in no way should be construed as a limitation on the scope of the invention.

Figure 5:
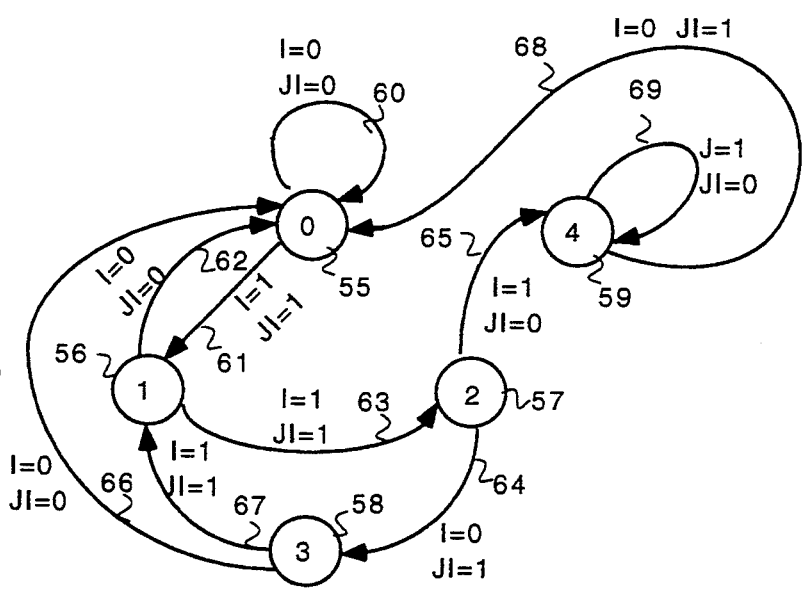
FIG. 5 is a state diagram of the present invention according to the specific example.

Referring to FIG. 5, the state diagram illustrates the specific example in which the present invention is chosen to be a processor controller which activates either the first phase peripheral control signal 127 or the second phase peripheral control signal 128 to request access to a memory bus if the processor controller receives an input signal active for only two system clock cycles. Similar to the state diagram in FIG. 2, there are five states labeled 55, 56, 57, 58, and 59. Each of these states has two state transitions represented by arrows 60, 61, 62, 63, 64, 65, 66, 67, 68, 69 and 70 which are the only possible transitions in the next clock cycle from their respective states. Moreover, these state transitions have been labeled arbitrarily with either a jump index of "0" or "1" in order to denote which transition is taken.

Figure 6:
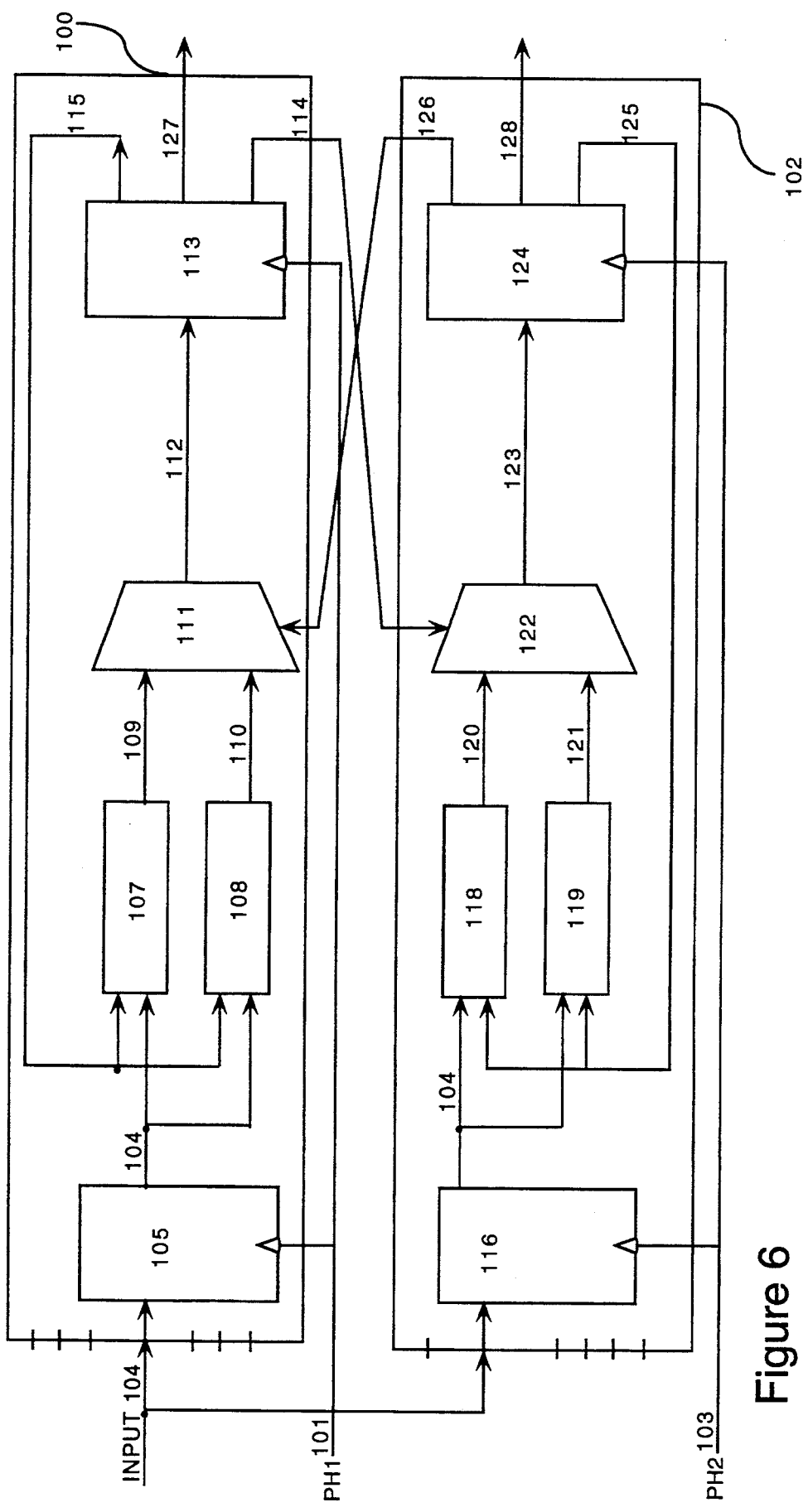
FIG. 6 is a block circuit diagram of an embodiment of the present invention for the specific example.

Since there are a maximum two state transitions from each state, both combinatorial logic networks include two combinatorial logic circuits: the first combinatorial logic network includes a first and second combinatorial logic circuit 107 and 108, and the second combinatorial logic network includes a third and fourth combinatorial logic circuit 118 and 119 as shown in FIG. 6.

The combinatorial logic circuits are constructed or programmed so that all the state transitions having a jump index equal to "0" are programmed or constructed in the first and third combinatorial logic circuits 107 and 118 while all the state transitions having a jump index equal to "1" are constructed or programmed into second and fourth combinatorial logic circuits 108 and 119 as shown in FIG. 6. In other words, the first/third combinatorial logic circuits 107 and 118 would be constructed or programmed to function as if the second/first phased circuit made a state transition of jump index "0" (JI=0) after a previous state transition by the first/second phased circuit. Also, the second/fourth combinatorial logic circuits 108 and 119 would be constructed or programmed to function as if the second/first phased circuit made a state transition of jump index "1" (J1=1) after the state transition by the first/second phased circuit.

In this particular example, the first and third combinatorial logic circuits 107 and 118 would be programmed or constructed according to the following Boolean equations:
(1) If PS="zero" and I="0"and JI="0", then NS="zero" and JI="0"; or
(2) If PS="zero" and I="1"and JI="0", then NS="one" and JI="1"; or
(3) If PS="one" and I="0"and JI="0", then NS="zero" and JI="0"; or
(4) If PS="one" and I="1"and JI="0", then NS="one and JI="1"; or
(5) If PS="two" and I="0 and JI="0", then NS="zero" and JI="1"; or
(6) If PS="two" and I="1"and JI="0", then NS="four" and JI="0"; or
(7) If PS="three" and I="0"and JI="0", then NS="zero" and JI="0"; or
(8) If PS="three" and I="1"and JI="0", then NS="one" and JI="1".
(9) If PS="four" and I="0"and JI="0", then NS="zero" and JI="1"; or
(10) If PS="four" and I="1"and JI="0", then NS="four" and JI="0".

According to the arbitrary designation of the jump index values, the second and fourth combinatorial logic circuits 19 and 119 would be constructed or programmed as follows:
(1) If PS="zero" and I="0"and JI="1", then NS="zero" and JI="0"; or
(2) If PS="zero" and I="1"and JI="1", then NS="two" and JI="1"; or
(3) If PS="one" and I="0"and JI="1", then NS="three" and JI="1"; or
(4) If PS="one" and I="1"and JI="1", then NS="four" and JI="0"; or
(5) If PS="two" and I="0 and JI="1", then NS="zero" and JI="0"; or
(6) If PS="two" and I="1"and JI="1", then NS="one" and JI="1"; or
(7) If PS="three" and I="0"and JI="1", then NS="zero" and JI="0"; or
(8) If PS="three" and I="1"and JI="1", then NS="two" and JI="1".
(9) If PS="four" and I="0"and JI="1", then NS="zero" and JI="0".
(10) If PS="four" and I="1"and JI="1", then NS="one" and JI="1".

The above indicated Boolean equations for the combinational logic circuits can be translated into state tables, denoted by Table 2 and Table 3, where Table 2 illustrates the resulting next state signal and jump index signal produced by the first (where (JI2=0)) and second (where JI2=1) combinational logic circuits based on the following:

| | |
|---|---|
| PS1 | = the first phase present state signal inputted into the first and second combinatorial circuits; |
| I | = the input signal; |
| JI2 | = the jump index signal outputted from the second output register based on its previous sampling of the input signal by the second phased circuit; |
| NS1 | = the next state signal outputted from the first or second combinational logic circuits; and |
| JI1 | = the jump index signal to be inputted to the second multiplexor in order to select the selected output control signal of the second phased circuit. |

TABLE 2

| PS1 | I | JI2 | NS1 | JI1 |
|---|---|---|---|---|
| 0 | 0 | 0 | 0 | 0 |
| 0 | 0 | 1 | 0 | 0 |
| 0 | 1 | 0 | 1 | 1 |
| 0 | 1 | 1 | 2 | 1 |
| 1 | 0 | 0 | 0 | 0 |
| 1 | 0 | 1 | 3 | 1 |
| 1 | 1 | 0 | 1 | 1 |
| 1 | 1 | 1 | 4 | 0 |
| 2 | 0 | 0 | 0 | 1 |
| 2 | 0 | 1 | 0 | 0 |
| 2 | 1 | 0 | 4 | 0 |
| 2 | 1 | 1 | 1 | 0 |
| 3 | 0 | 0 | 0 | 0 |
| 3 | 0 | 1 | 0 | 0 |
| 3 | 1 | 0 | 1 | 1 |
| 3 | 1 | 1 | 2 | 1 |
| 4 | 0 | 0 | 0 | 1 |
| 4 | 0 | 1 | 0 | 0 |
| 4 | 1 | 0 | 4 | 0 |
| 4 | 1 | 1 | 1 | 1 |

Table 3 illustrates the resulting next state signal and jump index signal produced by the second combinational logic network (from the third combinational logic circuit if JI1=0 and the fourth combinational logic circuit if JI1=1) wherein

| | |
|---|---|
| PS2 | = second phase present state signal inputted into the third and fourth combinational logic circuits; |
| JI1 | = the jump index signal outputted from the first output register for selecting the selected output control signal of the second phased circuit; |
| NS2 | = the next state signal outputted from the third and fourth combinational logic circuits; and |
| JI2 | = the jump index signal outputted from the second output register to the first multiplexor in order to select the selected output control signal of the first phased circuit. |

TABLE 3

| PS2 | I | JI1 | NS2 | JI2 |
|---|---|---|---|---|
| 0 | 0 | 0 | 0 | 0 |
| 0 | 0 | 1 | 0 | 0 |
| 0 | 1 | 0 | 1 | 1 |
| 0 | 1 | 1 | 2 | 1 |
| 1 | 0 | 0 | 0 | 0 |
| 1 | 0 | 1 | 3 | 1 |
| 1 | 1 | 0 | 1 | 1 |
| 1 | 1 | 1 | 4 | 0 |
| 2 | 0 | 0 | 0 | 1 |
| 2 | 0 | 1 | 0 | 0 |
| 2 | 1 | 0 | 4 | 0 |
| 2 | 1 | 1 | 1 | 0 |
| 3 | 0 | 0 | 0 | 0 |
| 3 | 0 | 1 | 0 | 0 |
| 3 | 1 | 0 | 1 | 1 |
| 3 | 1 | 1 | 2 | 1 |
| 4 | 0 | 0 | 0 | 1 |
| 4 | 0 | 1 | 0 | 0 |
| 4 | 1 | 0 | 4 | 0 |
| 4 | 1 | 1 | 1 | 1 |

The preferred embodiment of the present invention as shown in FIG. 6 will now be described in operation with respect to the timing diagrams and input signal shown in FIG. 7. The circuit shown in FIG. 6 is equivalent to the circuit in FIG. 4 except that there are only two combinatorial logic circuits within each phased circuit because there is a maximum of only two state transitions from any state in FIG. 5. Therefore, each element need not be discussed in full detail; rather, the operation of the circuit in FIG. 6 will be discussed.

The present invention would initially rest in present state "zero" until either the first input register 105 of the first phased circuit 100 or the second input register 116 of the second phased circuit 102 detects the input signal 104 becoming active. Based on the input signal illustrated in FIG. 7 which is the same as in FIG. 3, the first input register 105 would initially detect the input signal 104 becoming active at the rising edge of the first phased clock 101, a one-half phased clock cycle before the second input register 116 of the second phased circuit 102.

The first input register 105 would sequence and store the input signal 104 and would output the input signal 104 having a logic-level "1" into the first and second combinatorial logic circuits 107 and 108. The first phase present state signal 115 would be at state "zero" and is inputted into the first and second combinatorial logic circuits 107 and 108.

As shown in Table 2, the first combinatorial logic circuit 107 would output a plurality of output control signals including a next state signal having state "one" (NS1=1) and a jump index signal of "1" (JI1=1) 109. Such an output is produced because the first combinational logic circuit 107 is based on the premise that the second phased circuit 102 made a previous state transition of jump index "0" from the present state value contained in the first phase present state signal 115. Further, the second combinatorial logic circuit 108 would output a plurality of control signals including a next state signal having the state "two" (NS1=2) and a jump index signal of "1" (JI1=1) 110. The second combinatorial circuit 108 would output such next state and jump index values because the second combinatorial logic circuit 108, in this particular example, is constructed or programmed on the premise that the second phased circuit 102 made a previous state transition according to jump index "1" from the first phase present state (i.e., the second phased circuit 102 made a transition from state "zero" to state "one" before the first phased circuit 100 detected an active input).

However, since the second phased circuit 102 did not detect the input signal 104 becoming active before the first phased circuit 100 (i.e., the processor controller is truly in state "one"), the jump index signal inputted into the first multiplexor 111 from the second output memory circuit 124 would have a value "0" (JI2=0). Thus, the first multiplexor 111 would output the selected output control signal 112 originally inputted from the first combinatorial logic circuit 107 having the next state signal of state "one" (NS1=1) and the jump index signal of "1" (JI1=1) 109. The selected output control signal 112 would be registered by the first output register 113 wherein the next state signal (NS1=1) becomes the first phase present state signal 115 (PS1=1) and is fed back into the first and second combinatorial logic circuits 107 and 108 to await the next rising clock edge of the first phased clock while the jump index signal of "1" (JI1=1) would be outputted to the second multiplexor 122 through the first select line 114.

Thus, because the phased clocks are out-of-phase by 180°, the second input register 116 will subsequently sequence and store the input signal 104, before the first input register 105 could again sample the input signal 104 at the rising clock edge of the next first phased clock cycle. As shown in FIG. 7, the input signal 104 would become inactive before the second input register 116 stores and sequences the input signal 104 (I=0). The sampled input signal 104 would be outputted by the second input register 116 into the third and fourth combinatorial logic circuits 118 and 119. Also, the second phase present state signal 125, which currently has a state value of "zero" (PS2=0), would be inputted into the third and fourth combinatorial logic circuits 118 and 119. The value contained in the second phase present state signal (PS2=0) is different from the true present state of the processor (i.e., present state "one"), because the first phased circuit 100 made a transition unbeknownst to the second phased circuit 102. Rather, the second phased circuit 102 through redundancy of combinatorial logic circuits calculates the next state transitions as if the first phased circuit previously detected the processor undergoing a state transition (NSI=1, so that the present stateis truly "one") or remained in state "zero", the present state value contained in the second phase present state signal 125.

Based on the input signal (I=0) and the second phase present state signal 125 (PS2=0), according to Table 3, the third combinatorial logic circuit 118 will output a plurality of output control signals including a next state signal having a state value of "zero" (NS2=0) and a jump index value of "0" (JI2=0) as if the processor was in state "zero", and the fourth combinatorial logic circuit 119 would output a next state value of "zero" (NS2=0) and a jump index value of "0" (JI2=0), as if the processor was in state "one", which is in fact the true present state of the processor. The second multiplexor 122 would output the plurality Of control signals from the fourth combinatorial logic circuit 119 having a next state signal of state "zero" (NS2=0) and a jump index signal of "0" (JI2=0) because the first select line 114 has a value of "1" (JI1=1). As a result, the second phase present state signal is "zero" (PS2=0) and the jump index signal outputted to the first multiplexor 111 is "0" (JI2=0) through the second select line 126.

Figure 7:
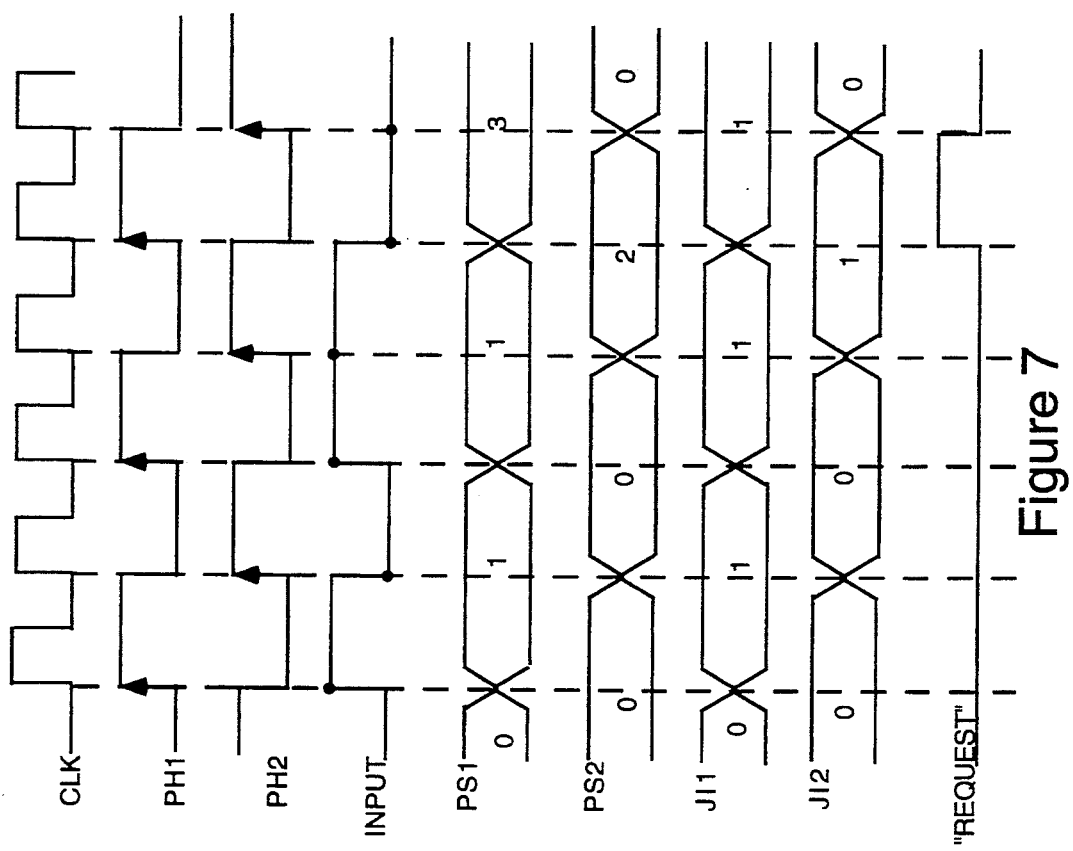
FIG. 7 shows a timing diagram of various control signals in the present invention according to the specific example.

In the third clock cycle, the first input register 105 would register the "active" input signal 104, as shown in the timing diagram in FIG. 7. The input 104 (I=1) and the first phase present state signal 115 (PS1=1) is inputted into the first and second combinatorial logic circuits 107 and 108. Based on the Boolean equations and Table 2 as shown above, the first combinatorial logic circuit 107 would output a plurality of output control signals including the next state signal of "one" (NS=1) and a jump index signal equal to "1" (JI1=1). The second combinatorial logic circuit 108 would output the next state signal having a state value of "zero" (NS1=0) because this combinatorial logic circuit is based on the second phased circuit 102 undergoing a previous state transition of jump index of "1"(i.e., from state "one" to state "two"). The first multiplexor 111 will output the plurality of output control signals from the first combinatorial logic circuit 107 since the second select line 126 would input a jump index of "0"(JI2=0) because the second phased circuit 102 made a state transition from state "one" to state "zero".

In the fourth clock cycle, the input signal 104 would be active when the second input register 116 sequences and stores the input signal 104, as shown in the FIG. 7. As a result, according to the operations previously discussed, the second multiplexor 122 would output the plurality of control signals from the fourth combinatorial logic circuit 119 because the first select line 114 is active (JI1=1). The plurality of control signals includes a next state signal having a state value of "two" (NS2=2) and (JI2=1).

In the fifth clock cycle, the input signal would be inactive when the first input register 105 sequences and stores the input signal 104, as shown in the FIG. 7. As a result, since the second select line 126 is active (JI2=1), the first multiplexor would output the control signals (NS=3; JI1=1) inputted from the second combinatorial logic circuit 107 which anticipated that the second phased circuit 101 made a state transition from the first phase present state "one" to state "two". As a result, the processor control would request access to the memory bus through the first phase peripheral control signal 127, as denoted by an active signal on the REQUEST output line in FIG. 7. If, however, the second phased circuit detected the transition to state "three", the second phase peripheral control signal 128 would have outputted an active REQUEST signal.

Figure 8:
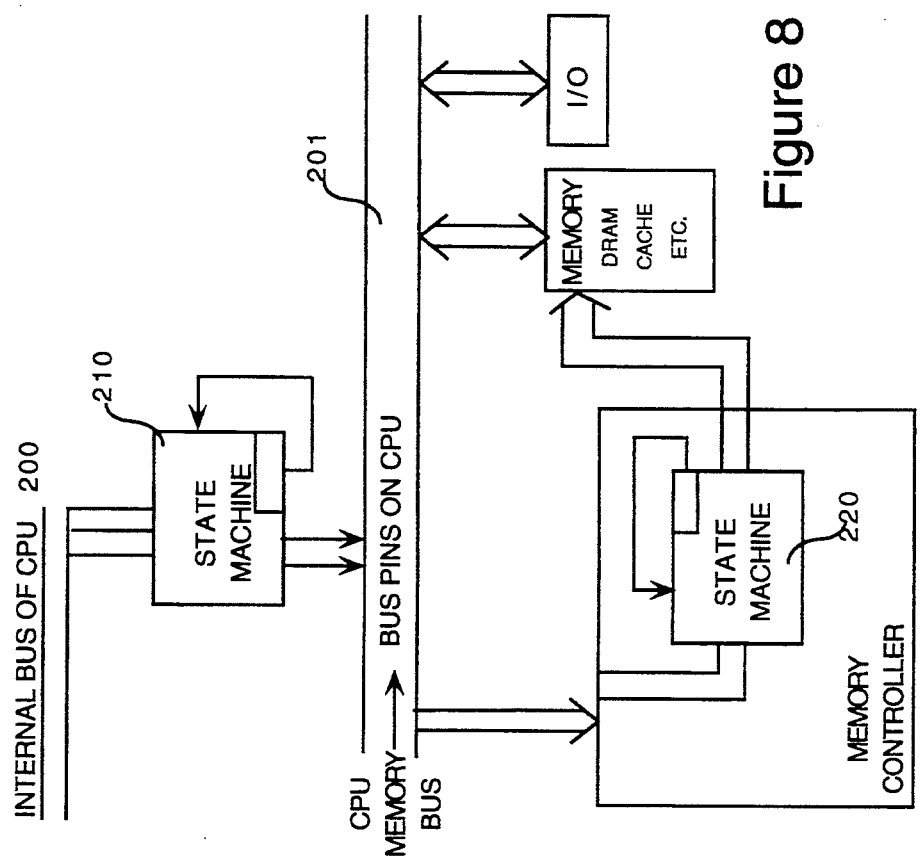
FIG. 8 is an illustration of the an embodiment of the present invention when used in any system as a memory controller and a processor controller.

Referring now to FIG. 8, the parallel phased state machine is shown in block diagram form in one of its many possible forms, as both a processor controller 210 and a memory controller 220. As a processor controller 210, the parallel phased state machine acts as an arbitrator between an internal bus for a central processing unit 200 and the central processing unit's internal bus 201. In this embodiment, the memory bus 201 is coupled to the main memory unit 202 containing DRAM, CACHE and other types of memory and passes information between the main memory unit 202 and the central processing unit 200. Moreover, the memory bus 201 is additionally coupled to the peripheral I/O devices 203. The parallel phased state machine may receive signals from the internal bus 200 requesting access to the memory bus 201. However, the present invention operating as a processor controller controls whether the access is requested depending on the state of the central processing unit at the time of the request. Additionally, the parallel phased state machine can operate as a memory controller 220 which selects what type of memory the system should use to perform a specific function. However, this state machine should not be limited to only implementation in processor, memory or other controllers, but can be implemented in most any device, especially devices comprising digital logic.

The present invention described herein may be designed in many different methods and using many different components. For example, the combinatorial logic circuits can be made of programmable logic arrays or an interconnection of standard logic gates Moreover, the present invention could be designed having three phased circuits where the phased clocks idealistically run at one-third the frequency of the system clock and the second phased clock is out-of-phase from the first phased clock by 120° and the third phased clock is out-of-phase from the first phased clock by 240°. While the present invention has been described in terms of various embodiments, other embodiments may come to mind to those skilled in the art without departing from the spirit and scope of the present invention. The invention should, therefore, be measured in terms of the claims which follow.

What we claim is:

1. A state machine circuit for sequentially processing an input signal to control a device, said circuit comprising:

a plurality of phased circuits individually clocked by a corresponding phased clock for sequencing and processing said input signal propagating into each of said plurality of phased circuits through a common signal line in order to control said device, each of said plurality of phased circuits generating an output signal dependent on a present state of said state machine circuit, wherein each of said phased circuits includes input register means for Sequencing and storing said input signal, wherein said input register means is clocked by said corresponding phased clock, combinatorial logic means for producing a plurality of output control signals based on a present state signal of said phased circuit and said input signal, each of said output control signals including a next state signal and a jump index signal, wherein said combinatorial logic means is electrically coupled to said input register means, an output register means, and a selector means, said selector means for selecting one of said plurality of output control signals inputted into said selector means from said combinatorial logic means, wherein said selected output control signal is inputted into said output register means, and said output register means being clocked by said corresponding unique phased clock, for registering said selected output control signal so that said next state signal of said selected output control signal is fed back into said combinatorial logic means for use as said present state signal, said jump index signal is output to a selector means of different a phased circuit;

connecting means for electrically coupling said plurality of phased circuits.

2. The state machine circuit according to claim 1 wherein said plurality of phased clocks operate at a frequency equal to a frequency of a system clock divided by M where M is the number of phased circuits employed in the state machine circuit, so that a first phased clock operates at frequency equal to the frequency of the system clock divided by M and the remaining phased circuits operate at the frequency of the first phased clock out-of-phase from said first phased clock by approximately. (R*360° /M) wherein R=1 for the second phased circuit, R=2 for the third phased circuit until R=N—1 for the Nth phased circuit.

3. The state machine circuit according to claim 1 wherein said connecting means inputs the jump index signal of said selected output control signal to select the selected control signals from a predetermined one of said plurality of said phased circuits.

4. The state machine circuit according to claim 1 wherein said output memory means outputs the selected output control signal, absent the next state signal and jump index signal, to said device.

5. A state machine circuit for sequentially processing an input signal propagating through a common signal line to control a device, said circuit comprising:

first phased circuit means for sequencing and processing said input signal to assist in the control of said device through at least one output signal, wherein said first phased circuit means is clocked by a first phased clock and includes first input register means for sequencing and storing said input signal, wherein said first input register means, being clocked by said first phased clock, outputs said input signal to a first combinatorial logic means, said first combinatorial logic means for producing a plurality of output control signals based on a first phase present state signal and said input signal, wherein each of said output control signals includes a first phase next state signal and a first phase jump index signal, and said first combinatorial logic means is electrically coupled to said first input register means, a first output register means, and a first selector means, said first selector means for selecting one of said plurality of output control signals inputted into said first selector means from said first combinatorial logic means, wherein said selected output control signal is outputted into said first output register means, and said first output register means, being clocked by said first phased clock, for sequencing and storing the selected output control signal so that said first phase next state signal of said selected output control signal is fed back into said first combinatorial logic means for use as said first phase present state signal and said jump index signal is output to a second selector means; and second phased circuit means for sequencing and processing said at least one input signal to assist in the control of said device through at least one output signal, wherein said second phased circuit means is clocked by a second phased clock and includes second input register means for sequencing and storing said input signal propagating through said common signal line, wherein said second input register means, being clocked by said second phased clock, outputs said input signal to a second combinatorial logic means, second combinatorial logic means for producing a plurality of output control signals based on a second phase present state signal and said input signal, wherein each of said output control signals includes a second phase next state signal and a second phase jump index signal, said second combinatorial logic means is electrically coupled to said second input register means, a second output register means, and a second selector means, said second selector means for selecting one of said plurality of output control signals inputted into said second selector means from said second combinatorial logic means, wherein said selected output control signal is outputted into said second output register means, and said second output register means, being clocked by said second phased clock, for sequencing and storing the selected output control signal so that said second phase next state signal of said selected output control signal is fed back into said second combinatorial logic means for use as said second phased present state signal; and connecting means for electrically coupling said first output register means to said second selector mean and said second output means to said first selector means for transferring said first jump index to said second selector means and said second phase jump index to said first selector means.

6. The state machine circuit according to claim 5 wherein said first combinatorial logic means include a plurality of combinatorial logic circuits, and each of said combinational logic circuits include a plurality of standard logic gates having no state retention capabilities, wherein said standard logic gates are electrically coupled together to produce a corresponding output control signal according to a predetermined Boolean equation.

7. The state machine circuit according to claim 5 wherein said second combinatorial logic means includes a plurality of combinatorial logic circuits, each of said combinatorial logic circuits includes a plurality of standard logic gates having no state retention capabilities, wherein said standard logic gates are electrically coupled together to produce a corresponding output control signal according to a predetermined Boolean equation.

8. The state machine circuit according to claim 5 wherein said first output register means transmits the first phase jump index signal of said selected output control signal into said second selector means through said connecting means in order to choose the selected output control signal based upon which state transition is made by said first phased circuit means.

9. The state machine circuit according to claim 5 wherein said second output register means transmits the second phase jump index signal of said selected output control signal into said first selector means through said connecting means in order to choose the selected output control signal based upon which state transition is made by said second phased circuit means.

10. The state machine circuit according to claim 5 wherein said first output register means outputs the selected output control signal, absent the next state signal and the first phase jump index signal, to said device.

11. The state machine circuit according to claim 5 wherein said second output register means outputs the selected output control signal, absent the next state signal and the second phase jump index signal, to said device.

12. A state machine circuit according to claim 5 wherein said second phased clock operates at an identical rate as said first phased clock but is 180° out of phase from said first phased clock, both said first phased clock and said second phased clock operating at a frequency equal to one-half frequency of a system clock.

13. A state machine circuit for sequentially processing an input signal propagating through a common signal line to control a device, said circuit comprising:
a first phased circuit clocked by a first phased clock and a second phased circuit clocked by a second phased clock, said first phased circuit including
a first input register clocked by said first phased clock, wherein said first input register sequences said input signal from said common signal line and stores said input signal for one clock pulse of said first phased clock, and the first input register outputs said input signal into a plurality of combinatorial logic circuits,
said plurality of combinatorial logic circuits are coupled to said first input register and a first output register to receive said input signal and a first phase present state signal respectively therefrom, and each of said plurality of combinatorial logic circuits outputs a plurality of output control signals including a next state signal and a first phase jump index signal,
a first multiplexer coupled to said plurality of combinatorial logic circuits for selecting one of said plurality of output control signals, said selected output control signal, which includes a first phase next state signal and a first phase jump index signal, is outputted to a first output register, and
said first output register is clocked by said first phased clock, said first output register is coupled to said first multiplexer to sequence and store said selected output control signal so that said first phase next state signal of said selected output control signal is fed back into said plurality of combinatorial logic circuits for use as said first phase present state signal, said first output register is also coupled to a second multiplexer of said second phased circuit for outputting said first phase jump index signal thereto; and
said second phased circuit including
a second input register clocked by said second phased clock, wherein said second input register sequences said input signal propagating through said signal lines and stores said input signal for one clock pulse of said second phased clock, and the second input register outputs said input signal into a plurality of combinatorial logic circuits,
said plurality of combinatorial logic circuits are coupled to said second input register and a second output register to sequence and store said input signal and a second phase present state signal respectively therefrom, and each of said plurality of combinatorial logic circuits outputs a plurality of output control signals including a next state signal and a jump index signal, a second multiplexer coupled to said plurality of combinatorial logic circuits for selecting one of said plurality of output control signals, said selected output control signal, which includes a second phase next state signal and a second phase jump index signal, is inputted to a second output register, and
said second output register is clocked by said second phased clock, said second output register is coupled to said second multiplexer to sequence and store said selected output control signal so that said second phase next state signal of said selected output control signal is fed back into said plurality of combinatorial logic circuits for use as said second phase present state signal, said second output register is also coupled to a first multiplexer in said first phased circuit for outputting said jump index signal thereto.

14. The state machine circuit according to claim 13 wherein said first phase jump index signal outputted from said first output register has a value from 0 to N-1, wherein there are "N" phased circuits.

15. The state machine circuit according to claim 13 wherein said second phase jump index signal outputted from said second output register has a value from 0 to N-1, wherein there are "N" phased circuits.

16. The state machine circuit according to claim 13 wherein said first output memory means outputs the selected output control signal, absent the first phase next state signal and the first phase jump index signal, to said device.

17. The circuit according to claim 13 wherein said second output memory means outputs the selected output control signal, absent the second phase next state signal and the second phase jump index signal, to said device.

18. A system comprising:
processor means for processing information within said system;
memory means for storing data to control the processing performed by said processor means;
bus means coupled between said memory means and said processing means for passing data between said memory means and said processor means; and
state machine means for controlling at least one of said processing means, said storing means and said communicating means, said state machine means including
first phased circuit means for sequencing and processing an input signal propagating through a common signal line to control a device through at least one output signal, wherein said first phased circuit means is clocked by a first phased clock and includes
first input register means for sequencing and storing said input signal, wherein said first input register means, being clocked by said first phased clock outputs said input signal to a first combinatorial logic means,
said first combinatorial logic means for producing a plurality of output control signals based on a first phase present state signal and said input signal, wherein each of said output control signals includes a first phase next state signal and a first phase jump index signal, and said first combinatorial logic means is electrically coupled to said first input register means, a first output register means, and a first selector means, said first selector means for selecting one of said plurality of output control signals inputted into said first selector means from said first combinatorial logic means, wherein said selected output control signal is outputted into said first output register means, and said first output register means, being clocked by said first phased clock, for sequencing and storing the selected output control signal so that said first phase next state signal of said selected output control signal is fed back into said first combinatorial logic means for use as said first phase present state signal and said jump index signal is output to a second selector means; and second phased circuit means for sequencing and processing said input signal to assist in the control of said device through at least one output signal, wherein said second phased circuit means is clocked by a second phased clock and includes second input register means for sequencing and storing said input signal propagating through said common signal line., wherein said second input register means, being clocked by said second phased clock outputs said input signal to a second combinatorial logic means, said second combinatorial logic means for producing a plurality of output control signals based on a second phase present state signal and said input signal, wherein each of said output control signals includes a second phase next state signal and a second phase jump index signal, and said second combinatorial logic means is electrically coupled to said second input register means, a second output register means, and a second selector means, said second selector means for selecting one of said plurality of output control signals inputted into said second selector means from said second combinatorial logic means, wherein said selected output control signal is outputted into said second output register means, and said second output register means, being clocked by said second phased clock,, for sequencing and storing the selected output control signal so that said second phase next state signal of said selected output control signal is fed back into said second combinatorial logic means for use as said second phased present state signal; and connecting means for electrically coupling said first output register means to said second selector means and said second output register means to said first selector means for transferring said first phase jump index to said second selector means and said second phase jump index to said first selector means.

19. The state machine means according to claim 18 wherein said first combinatorial logic means include a plurality of combinatorial logic circuits, each of said combinational logic circuits include a plurality of standard logic gates having no state retention capabilities, wherein said standard logic gates are electrically coupled together to produce a corresponding output control signal according to a predetermined Boolean equation.

20. The state machine means according to claim 18 wherein said second combinatorial logic means includes a plurality of combinatorial logic circuits, each of said combinatorial logic circuits include a plurality of standard logic gates having no state retention capabilities, wherein said standard logic gates are electrically coupled together to produce a corresponding output control signal according to a predetermined Boolean equation.

21. The state machine means according to claim 18 wherein said first output register means transmits the first phase jump index signal of said selected output control signal into said second selector means through said connecting means in order to choose the selected output control signal based upon which state transition is made by said first phased circuit means.

22. The state machine means according to claim 18 wherein said second output register means transmits the second phase jump index signal of said selected output control signal into said first selector means through said connecting means in order to choose the selected output control signal based upon which state transition is made by said second phased circuit means.

23. The state machine means according to claim 18 wherein said first output register means outputs the selected output control signal, absent the first phase next state signal and the first phase jump index signal, to said device.

24. The state machine means according to claim 18 wherein said second output register means outputs the selected output control signal, absent the second phase next state signal and the second phase jump index signal, to said device.

25. A state machine means according to claim 18 wherein said second phased clock operates at an identical rate as said first phased clock but is 180° out-of-phase from said first phased clock, both said first phased clock and said second phased clock operating at a frequency equal to one-half frequency of a system clock.

26. A system comprising a central processing unit, a main memory unit, a bus coupling said main memory unit to said central processing unit, a state machine circuit electrically coupled with said bus, said state machine circuit includes a first phased circuit clocked by a first phased clock and a second phased circuit clocked by a second phased clock, said first phased circuit including a first input register clocked by said first phased clock, wherein said first input register sequences an input signal propagating through a common signal line and stores said input signal for one clock pulse of said first phased clock, and the first input register outputs said input signal into a plurality of combinatorial logic circuits, said plurality of combinatorial logic circuits are coupled to said first input register and a first output register to receive said registered input signal and a first phase present state signal respectively therefrom, and each of said plurality of combinatorial logic circuits outputs a plurality of output control signals including a next state signal and a jump index signal, a first multiplexer coupled to said plurality of combinatorial logic circuits for selecting one of said plurality of output control signals, said selected output control signal, which includes a first phase next state signal and a first phase jump index signal, is outputted to a first output register, and said first output register is clocked by said first phased clock, said first output register is coupled to said first multiplexer to sequence and store said selected output control signal so that said first phase next state signal of said selected output control signal is fed back into said plurality of combinatorial logic circuits for use as said first phase present state signal, said first output register is also coupled to a second multiplexer of said second phased circuit for outputting said first phase jump index signal thereto; and said second phased circuit including a second input register clocked by said second phased clock, wherein said second input register sequences said at least one input signal propagating through said common signal line and stores said at least one input signal for one clock pulse of said second phased clock, and the second input register outputs said at least one input signal into a plurality of combinatorial logic circuits, said plurality of combinatorial logic circuits are coupled to said second input register and a second output register to sequence and store said at least one input signal and a second phase present state signal respectively therefrom, and each of said plurality of combinatorial logic circuits outputs a plurality of output control signals including a next state signal and a jump index signal, a second multiplexer coupled to said plurality of combinatorial logic circuits for selecting one of said plurality of output control signals, said selected output control signal, which includes a corresponding next state signal and jump index signal, is inputted to a second output register, and said second output register is clocked by said second phased clock, said second output register is coupled to said second multiplexer to sequence and store said selected output control signal so that said next state signal of said selected output control signal is fed back into said plurality of combinatorial logic circuits for use as said second phase present state signal, said second output register is also coupled to a first multiplexer in said first phased circuit for outputting said jump index signal thereto.

27. The state machine circuit according to claim 26 wherein said first phase jump index signal outputted from said first output register has a value from 0 to N-1, wherein there are "N" phased circuits.

28. The state machine circuit according to claim 26 wherein said second phase jump index signal outputted from said second output register has a value from 0 to N-1, wherein there are "N" phased circuits.

29. The state machine circuit according to claim 26 wherein said first output memory means outputs the selected output control signal, absent the first phase next state signal and the first phase jump index signal, to said device.

30. The circuit according to claim 26 wherein said second output memory means outputs the selected output control signal, absent the second phase next state signal and the second phase jump index signal, to said device.

31. A method for sequentially processing at least one input signal to control a device, said method comprising the steps of:

inputting an input signal directly into a plurality of phased circuits, said plurality of phased circuits are each uniquely clocked at an identical same processor rate but at a different phase, wherein each phased circuit sequences and stores said input signal in an input register within said phased circuit;

outputs said input signal into a combinatorial logic circuit within said phased circuit;

produces a plurality of output control signals in said combinatorial logic circuit, each of said plurality of output control signals includes a next state signal and a jump index signal;

outputs said plurality of output control signals into a multiplexer within said phased circuit;

selects one of said plurality of output control signals from said combinatorial logic circuit within said phased circuit based on a jump index signal outputted from a predetermined output register external to said phased circuit;

outputs said one of said plurality of output control signals into an output register within said phased circuit, wherein said one of said plurality of output control signals is sequenced and stored by said output register;

feeds back said next state signal into said combinatorial logic network;

outputs said jump index signal into a multiplexer external to said phased circuit: and outputs the one of said plurality of control signals, excluding the next state signal and the jump index signal to said device.

* * * * *

UNITED STATES PATENT AND TRADEMARK OFFICE
CERTIFICATE OF CORRECTION

PATENT NO. : 5,394,557
DATED : February 28, 1995
INVENTOR(S) : David Ellis

It is certified that error appears in the above-identified patent and that said Letters Patent is hereby corrected as shown below:

In column 8 at line 45 insert --number "1" for each-- following "the" and prior to "successive"

In column 9 at line 43 delete "(J1=1)" and insert --(Jl=1)--

In column 14 at line 49 delete "Sequencing" and insert --sequencing--

In column 16 at line 30 delete "mean" and insert --means--

Signed and Sealed this

Eighth Day of October, 1996

Attest:

BRUCE LEHMAN

Attesting Officer

Commissioner of Patents and Trademarks